United States Patent
Birchbauer et al.

(10) Patent No.: US 10,852,715 B2
(45) Date of Patent: Dec. 1, 2020

(54) SYSTEM AND METHOD FOR VISUALIZING AND VALIDATING PROCESS EVENTS

(71) Applicant: Siemens Aktiengesellschaft, Munich (DE)

(72) Inventors: Josef Alois Birchbauer, Seiersberg (AT); Michael Hornacek, Vienna (AT); Daniel Schall, Vienna (AT); Dietmar Schmidt, Vienna (AT); Paul Schneeweiss, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 96 days.

(21) Appl. No.: 16/301,941

(22) PCT Filed: May 22, 2017

(86) PCT No.: PCT/EP2017/062216
§ 371 (c)(1),
(2) Date: Nov. 15, 2018

(87) PCT Pub. No.: WO2017/215885
PCT Pub. Date: Dec. 21, 2017

(65) Prior Publication Data
US 2019/0204814 A1 Jul. 4, 2019

(30) Foreign Application Priority Data
May 24, 2016 (AT) .................................. 50468/2016

(51) Int. Cl.
*G05B 19/418* (2006.01)
*G05B 23/02* (2006.01)

(52) U.S. Cl.
CPC . *G05B 19/41875* (2013.01); *G05B 19/41895* (2013.01); *G05B 23/0216* (2013.01);
(Continued)

(58) Field of Classification Search
None
See application file for complete search history.

(56) References Cited

U.S. PATENT DOCUMENTS

| | | |
|---|---|---|
| 6,426,716 B1 | 7/2002 | McEwan |
| 8,108,795 B2 * | 1/2012 | Urrabazo ............... H04N 5/765 715/810 |

(Continued)

FOREIGN PATENT DOCUMENTS

| | | |
|---|---|---|
| DE | 102010048400 | 9/2011 |
| WO | WO 2015/191444 | 12/2005 |

(Continued)

OTHER PUBLICATIONS

International PCT Search Report based on PCT/EP2017/062216 dated Aug. 22, 2017.

*Primary Examiner* — Ramesh B Patel
(74) *Attorney, Agent, or Firm* — Cozen O'Connor

(57) ABSTRACT

A method for visualizing and validating process events in process monitoring systems, wherein a permanently installed sensor system reports states to a process monitoring system, if predefined limit values are exceeded, then the process monitoring system initiates, plans and performs local data acquisition using a mobile sensor, where the result of this data acquisition is analyzed and visualized in the process monitoring system and is integrated in the state information relating to the process or the installation.

5 Claims, 3 Drawing Sheets

(52) U.S. Cl.
CPC ... *G05B 2219/32404* (2013.01); *Y02P 90/285* (2015.11); *Y02P 90/60* (2015.11)

(56) References Cited

U.S. PATENT DOCUMENTS

| | | | | |
|---|---|---|---|---|
| 8,122,050 | B2* | 2/2012 | Mordvinov | G06F 16/245 |
| | | | | 707/769 |
| 8,839,133 | B2* | 9/2014 | Abeln | G06Q 10/06 |
| | | | | 715/771 |
| 8,954,870 | B2* | 2/2015 | Martin | G06F 8/38 |
| | | | | 715/763 |
| 9,201,910 | B2* | 12/2015 | Hsieh | H04L 67/42 |
| 9,922,282 | B2* | 3/2018 | Weller | B64F 5/10 |
| 10,115,048 | B2* | 10/2018 | Weller | G08G 5/0013 |
| 10,623,832 | B2* | 4/2020 | Weatherhead | E21B 41/00 |
| 2002/0026431 | A1 | 2/2002 | Pedersen et al. | |
| 2005/0033481 | A1* | 2/2005 | Budhraja | G01R 21/133 |
| | | | | 700/286 |
| 2006/0238339 | A1 | 10/2006 | Primm et al. | |
| 2009/0113332 | A1* | 4/2009 | Farahmand | G06F 8/34 |
| | | | | 715/771 |
| 2011/0125477 | A1* | 5/2011 | Lightner | G05B 17/02 |
| | | | | 703/11 |
| 2014/0312165 | A1 | 10/2014 | Mkrtchyan | |
| 2016/0116915 | A1 | 4/2016 | Pulleti et al. | |
| 2017/0021925 | A1* | 1/2017 | Weller | G06F 11/00 |
| 2017/0193414 | A1* | 7/2017 | Finkel | G05B 19/41895 |
| 2019/0079996 | A1* | 3/2019 | Mochel | G06F 16/248 |

FOREIGN PATENT DOCUMENTS

| | | |
|---|---|---|
| WO | WO2008/046367 | 4/2008 |
| WO | WO2014/029431 | 2/2014 |
| WO | WO2015/147871 | 10/2015 |

\* cited by examiner

SYSTEM AND METHOD FOR VISUALIZING AND VALIDATING PROCESS EVENTS

CROSS-REFERENCE TO RELATED APPLICATIONS

This is a U.S. national stage of application No. PCT/EP2017/062216 filed May 22, 2017. Priority is claimed on AT Application No. 50468/2016 filed May 24, 2016, the content of which is incorporated herein by reference in its entirety.

BACKGROUND OF THE INVENTION

1. Field of the Invention

The present invention relates to control systems and, more particularly, to a system and method for visualizing and validating process events in process monitoring systems.

2. Description of the Related Art

For the purpose of automated control of processes and installations, it is known to use Supervisory Control and Data Acquisition (SCADA) systems. These are understood to be control systems that allow the monitoring, control and visualization of industrial processes. Components of these control systems include both hardware components such as sensors, PLCs or RTUs for measuring and transmitting the process values, and software such as SIMATIC WinCC OA for a user interface, alarm management, data archiving and process visualization.

A significant field of use for SCADA systems relates to the monitoring and control of supply infrastructures, such as oil or gas pipelines, which typically extend over large geographical areas and consist of various installation parts.

The secure and reliable operation of these infrastructures is not only of the utmost importance in commercial terms for the operator and the population to be supplied, but must also be guaranteed at all times as an operational requirement under official regulations.

While the SCADA system allows the installation operator to monitor typical parameters, such as the current pressure, flow or temperature of the medium transported in the pipeline via stationary sensors at various check points, the operator does not have any way to obtain more complex and unstructured data from the same system. This data includes information and knowledge that can be derived from recordings made by imaging sensor technology (e.g., color cameras, Near Infared (NIR) cameras, Light Detection and Ranging (LiDAR) of supply facilities.

SUMMARY OF THE INVENTION

In view of the foregoing, it is an object of the invention to further develop the conventional prior art systems and in particular to make use of image data for the purpose of process control.

This and other objects and advantages are achieved in accordance with the invention by a method for visualizing and validating process events in process monitoring systems, where a permanently installed sensor system reports states to a process monitoring system and if predefined limit values are exceeded the process monitoring system initiates, plans and performs local data acquisition using a mobile sensor, and the result of this data acquisition is analyzed and visualized in the process monitoring system and is integrated into the state information relating to the process or the installation.

Mobile sensors attached to airborne platforms (e.g., drones, helicopters, airplanes) can provide geo-referenced image data that can be analyzed by Computer Vision-based algorithms.

In accordance with the invention, these data sources are also used to describe and digitize the process state. In particular, the association of numerically available process values in the SCADA system with information obtained from image data can provide the operator with additional valuable knowledge.

Advantageous applications in the monitoring of overground or underground pipelines include in particular detecting when the pipeline filling fails to reach a prescribed value, the detection of terrain changes over time and the evaluation of damage to the pipeline due to construction work, vandalism, and mechanical wear.

By using mobile imaging sensor technology in combination with Computer Vision-based algorithms, it is possible to minimize manual overheads and generate reproducible results, and also to process large-scale areas and the large data volumes resulting therefrom.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained with reference to exemplary figures in which.

DETAILED DESCRIPTION OF THE EXEMPLARY EMBODIMENTS

Figure 1:
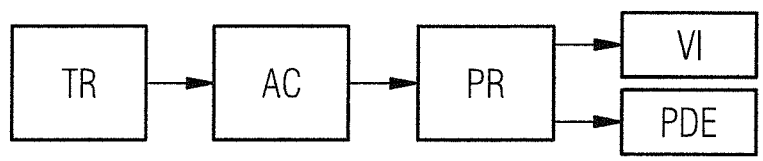
FIG. 1 shows the schematic sequence of the method in accordance with the invention.

The inventive control and monitoring system as per FIG. 1 is based on a conventional Supervisory Control and Data Acquisition (SCADA) system, such as marketed by Siemens AG under the name WinCC OA (Windows Control Center Open Architecture), for example.

Critical process values and malfunctions of the monitored installation are captured via sensors and represented as alarms and/or reports in the SCADA system.

If these critical process values and malfunctions cannot be remedied by control interventions, then manual checking and visual examination by technical personnel are required.

Relevant software tools such as Advanced Maintenance Suite (AMS) for WinCC OA are available for performing checks and maintenance. These are designed for management by technical personnel, but do not allow automated and event-driven image acquisition, e.g. via drones flying over extensive infrastructure installations.

The conventional systems do not make provision for feedback of results from the image analysis into the SCADA system. Manual inspections without digitization of the observations do not, however, provide reproducible results and are therefore unsuitable for applications, such as Change Detection, for which a structured and comparable sequence is required.

WinCC OA contains video management functions, such that stationary video hardware can be integrated into the SCADA system. It is therefore possible for SCADA users to monitor installations, such as tunnel systems or traffic facilities, and early detection of problem situations is ensured. However, stationary cameras cannot be used for large-scale supply infrastructures, such as pipelines or power lines, which may extend over several thousand kilometers and require high-resolution geo-referenced image data for fault detection.

In order to inspect extensive supply installations, such as oil or gas pipelines, it is customary to use airborne devices, e.g. helicopters, at regular intervals. Here, anything conspicuous is noted and critical locations are inspected more closely if necessary. In addition, the video material recorded during the flight can be subsequently analyzed offline. Large areas can be monitored in this way, but the usefulness of the flight is nonetheless dependent on the experience of the personnel involved. Therefore reproducibility of the results cannot be guaranteed.

The existing solution frameworks are therefore associated with high personnel overheads and high costs, resulting from manual inspections and analyses and a lack of digitization of the observations.

In accordance with the invention, for the purpose of visualizing and validating process events in SCADA systems, the states that are reported by a permanently installed sensor system are analyzed and if predefined limit values are exceeded, local data acquisition is planned and performed using a mobile sensor. The result of this data acquisition is visualized in the SCADA system.

The data acquisition preferably consists in recordings made by imaging sensor technology, such as cameras, Near Infared (NIR) cameras or Light Detecting and Ranging (LiDAR). These recordings are analyzed and reused in the SCADA system.

Provision is advantageously made for the imaging sensor technology to be arranged on airborne platforms. These include both UAVs (unmanned aerial vehicle), such as drones, which may fly autonomously or may be piloted, and manned aircraft such as helicopters or airplanes.

The recordings made by the mobile sensor technology are used to obtain information about the nature of the ground surface or objects and areas that are relevant to the installation operator.

For example, the inventive method is realized as a task-oriented process that is performed by a Task Server component of the SCADA system.

Requests to the Task Server are referred to as tasks, which are defined by their type, input parameters and outputs such as indices or layers. Examples of tasks are "Import Reference Model" in order to import a geo-referenced model, "Acquire Images" in order to perform a flight and subsequently import the recordings, or application-specific tasks such as the computation of pipeline fillings, terrain changes or detection of anomalies.

As illustrated in FIG. 1, the execution of a task can be broken down into the substeps of Trigger TR, Acquisition AC, Processing PR and Visualization VI or Process Data Enrichment PDE. The overall process is orchestrated and monitored by the Task Server. The sequence of the task is executed by corresponding asynchronous invocations of Computer Vision services, database interactions and accesses to the file system, and the outputs are fed back into the SCADA system.

The first step of Trigger TR, i.e., the initiation of the inventive method, may occur due to, e.g., a critical process value or the result of a computation in the SCADA system. For example, non-typical pressure differences at a specific position of the pipeline may be an indication of a leakage in the pipeline. Specific weather conditions can also provide this Trigger TR. In addition to the event-based creation of a new task, image acquisition can also be planned for defined time points. For this, the WinCC OA Operator can select a Region of Interest (ROI) of the pipeline as a basis for the subsequent flight plan.

In WinCC OA, a component acting as a "manager" (Task Manager) transfers the request and any available geospatial information to the Task Server component. The Task Server receives the requests and processes them in accordance with the parameters that are forwarded.

For the second step of Acquisition AC, i.e., the procurement of the image information via, e.g., drones, the flight plan for the flight is preferably generated automatically by the parameters of the task from the SCADA system.

Geospatial information from the stationary sensors must be available for this purpose, so that a valid route over regions having suspicious or critical process values can be produced therefrom. The flight plan can also be produced or adapted manually by defining way points for the flight.

Depending on technical and legal factors, the flight itself is performed autonomously via an airborne platform and its flight plan or is assisted manually by a pilot.

In the third step of Processing PR, i.e., the computation of indices, Computer Vision modules are invoked by the Task Server depending on the task type and task parameters, e.g., in order to compute fillings along the pipeline (Depth of Cover) or to detect changes over time (Change Detection). All results and metadata of the analysis are stored in a Task Server database as part of the Process Data Enrichment, in order to ensure that processes can be retraced and the indices can be integrated into the SCADA installation image.

The results of the image analysis may consist of indices or layers that can be visualized in a Map Server (e.g., GeoServer) in their spatial and temporal context.

In the fourth step of Visualization VI in SCADA, the results are also made available in the SCADA system via Task Manager components and the interface to the Task Server. They can therefore be represented directly in the SCADA User Interface or viewed together with existing process data.

Figure 2:
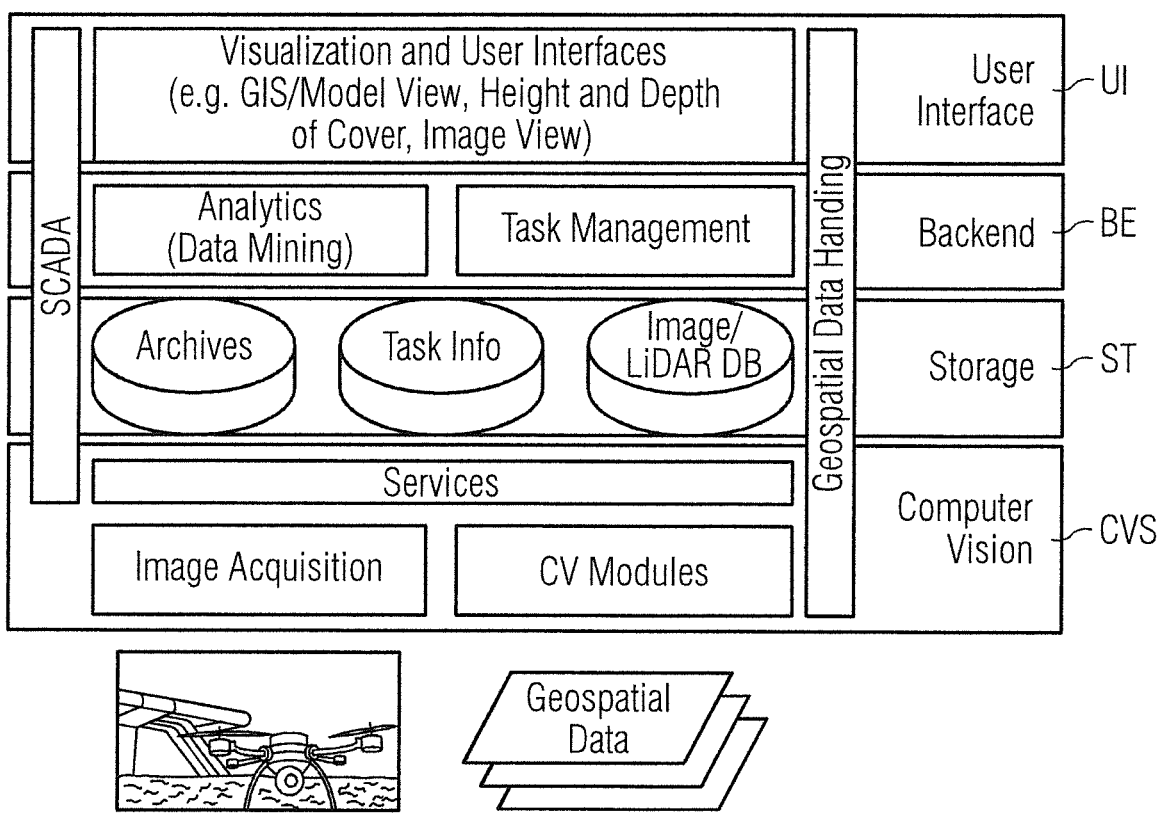
FIG. 2 shows the architecture of a Supervisory Control and Data Acquisition (SCADA) system in accordance with the invention.

In order to realize the inventive method as a task-oriented process, the exemplary embodiment provides a flexible architecture as per FIG. 2, which can easily be integrated into an existing SCADA system, such as WinCC OA, and is also suitable for various industries and applications by virtue of its modular structure.

In this way, a core element of this architecture is a Task Server, which receives requests from the SCADA system and executes them in accordance with their type and parameters.

In summary, the Task Server is responsible for the following tasks: (i) receiving different task requests such as performing flights over a specific area, computations based on the recordings that are acquired or on previous results, (ii) managing tasks and projects such that computations are fully retraceable, (iii) importing recordings from flights and metadata into a relational spatial database, (iv) invoking Computer Vision services depending on parameters of the task request to compute indices and generate layers, (v) creating layer objects in a Map Server (e.g., GeoServer) to visualize geospatial data, and providing location-related information via standard interfaces such as Web Map Service (WMS), Web Coverage Service (WCS), Web Feature Service (WFS) and Web Processing Service (WPS), and (vi) providing an interface to existing SCADA software for feedback of results and visualizations in the SCADA User Interface.

The inventive system architecture shown in FIG. 2 can be broken down into the levels of User Interface UI, Back End BE, Storage ST and Computer Vision services CVS. Each level is able to process, store or visualize spatial data. The modular and service-oriented structure allows new fields of use to be implemented and further Computer Vision services to be linked in.

The User Interface UI of the SCADA system is used to visualize the outputs from flights. The installation operator and SCADA users can therefore view these as normal process values and analyze them in context. Cartographic material and generated layers can also be represented via a Map Server (e.g., GeoServer) and corresponding widgets in the User Interface UI. The Task Server TS is provided as a component that is independent from the SCADA system. As a result, a programming interface offered by Websocket services also allows further user interface implementations to be linked in, e.g., web-based user interfaces.

The Task Server contains the processing logic for the task requested by the User Interface and provides interfaces to the clients. As a Backend BE in the overall architecture, the Task Server interacts with the SCADA Software, an image database and the relational spatial database as data storage, and with Computer Vision services, these being required to execute the task. Also integrated is an Analytics Module that assists the analysis of SCADA process values via Data Mining methods and can therefore generate additional Triggers.

Three data storage entities are provided, namely an archive database, Task Info data storage, and an image database. The archive database is part of the SCADA software and allows the historization of all process values captured by sensors. This is also a prerequisite for viewing process values together with the results of image analyses over the course of time.

The Task Info data storage is part of the Task Server component and is provided as a relational spatial database (e.g., Oracle Spatial). All requests to the Task Server are stored in this database together with parameters, log data and the results of the Computer Vision algorithms to ensure complete traceability of the processes.

Also stored in the database are geo-referenced spatial objects, such as raster layers, and vector layers, which are visualized by a Map Server.

The image database is realized as a file storage database (NAS) and is used to store the original images from the image acquisition. These are referenced in the Task Info database and may be used as input for Computer Vision algorithms.

Computer Vision functions are provided via Services (Websocket/REST), and are invoked by the Task Server to execute the task workflows. Input for the computation typically comprises the recordings created by the flight or layers generated in previous tasks.

Examples of Computer Vision services include the computation of "Core" objects, such as color layers and height layers, or application-specific layers, such as Depth of Cover, in order to represent and analyze the filling or change for the purpose of detecting terrain changes. The relevant algorithms are sometimes very processor-intensive and process large data volumes, and therefore special hardware such as CUDA is used for parallel computation.

In addition to the Task Server as a Back End BE in the overall architecture, the User Interface UI represents a further important component of the inventive system architecture. The installation operator uses the User Interface UI of the local SCADA software for monitoring and controlling processes and states, which are currently described by process values. These are enhanced by the automatically generated outputs from flights, and analyzed together in the SCADA User Interface UI, thereby providing the user with an augmented view of the installation. Map widgets support the display of cartographic material and layers, which are generated in addition to indices by the Task Server. The installation operator can therefore monitor the supply infrastructure in its spatial context.

In order to illustrate the benefits of the Task Server and the integrated representation of the results in the SCADA User Interface UI, the computation of the filling and a "Depth of Cover" layer is described as a possible field of use.

Figure 3:
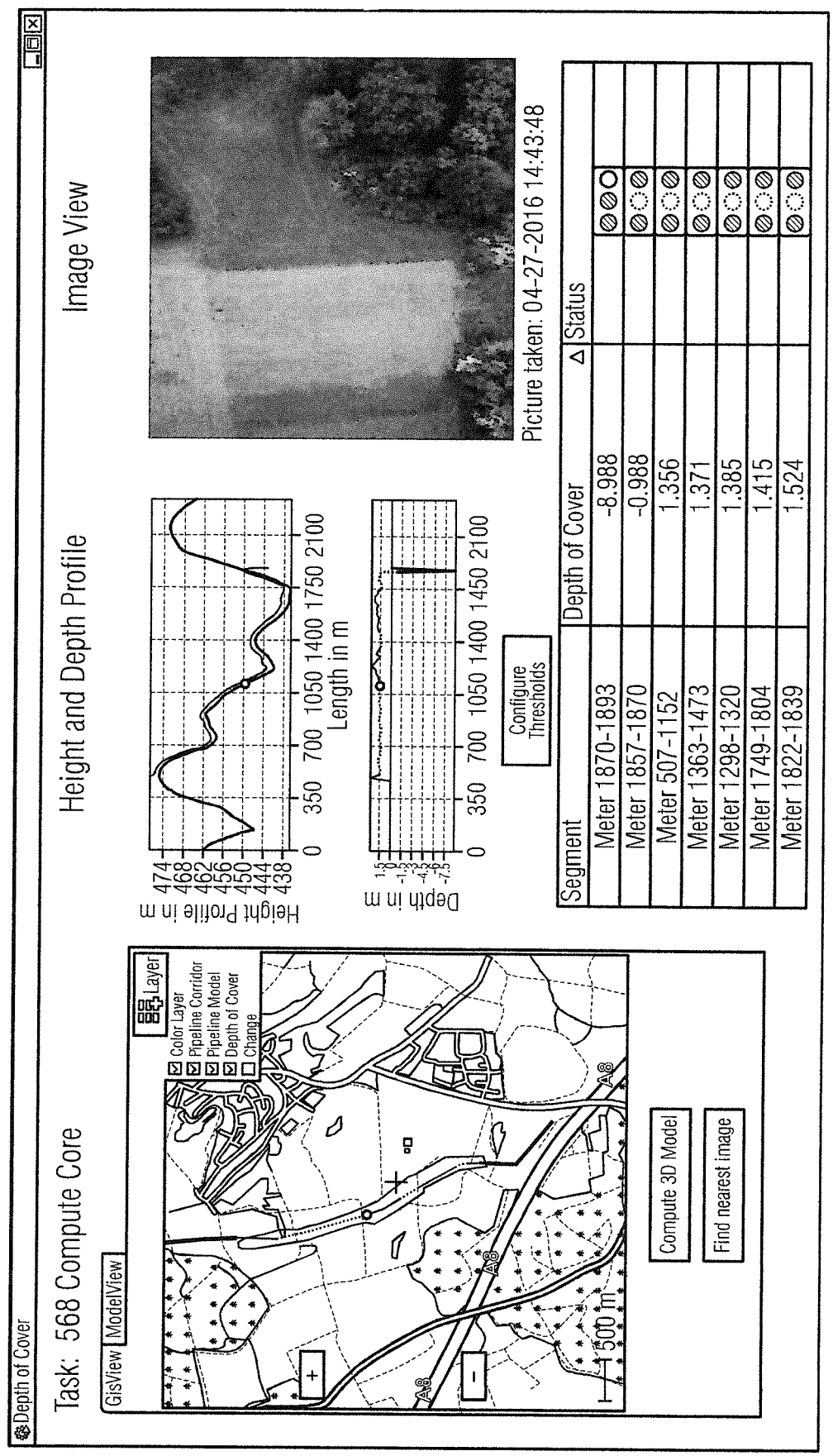
FIG. 3 shows a User Interface (UI) that is integrated into the WinCC OA SCADA software.

By way of example, FIG. 3 shows a User Interface UI which has been integrated into the SCADA Software WinCC OA for the purpose of analyzing the filling along a pipeline section.

The Depth of Cover layer is computed via Computer Vision algorithms and contains the filling of the pipeline, i.e., how much material is present above the pipeline. The filling is an important index for the installation operator, because a minimum value must be guaranteed and a value that is too low would, in extreme cases, signify exposure of the pipeline and consequently a high risk of damage. Too high a value can likewise indicate a slump and locations at risk.

For this field of use, a User Interface UI is provided that visualizes the pipeline and generated layers in the geographical context. The numerically calculated filling values are also represented in a two-dimensional diagram.

With a "Find nearest image" function, it is also possible to create a link to the original images recorded.

The exemplary User Interface UI offers two different views, namely GisView or ModelView. Using the GisView widget, various layers that were previously generated by the Task Server can be included or excluded and rendered by a Map Server.

Cartographic material from, e.g., Open Street Map (OSM) is included in a window, thereby providing the SCADA user with geospatial information such as place names, street names and natural features. A "Color Layer" is created from the recorded images and shows the recorded area from a bird's-eye perspective.

Critical filling values in the Depth of Cover layers are already marked in color in the cartographic representation and can be viewed more closely using the zoom-in function of the widget.

The height and filling profile or "Height and Depth Profile" is a two-dimensional representation of the pipeline and visualizes both the absolute height of the pipeline based on its reference model and the filling relative to the pipeline height. The coloring of critical filling values is effected in a similar manner to the representation in the GisView widget. A red dot establishes the link between GisView and Height and Depth Profile, and can be set by the user.

If the "Find nearest image" button is pressed, the nearest original image to the map extract is displayed in the Image View widget via Task Server functions. Using this function, the installation operator can interactively inspect critical locations of extensive pipelines with a very high level of detail.

A "segment table" is also shown in a separate window. For this, consecutive critical values of the cover for segments are summarized and represented by their minimum filling value. A traffic-light logic system shows the installation operator long sections with a high risk potential.

Figure 4:
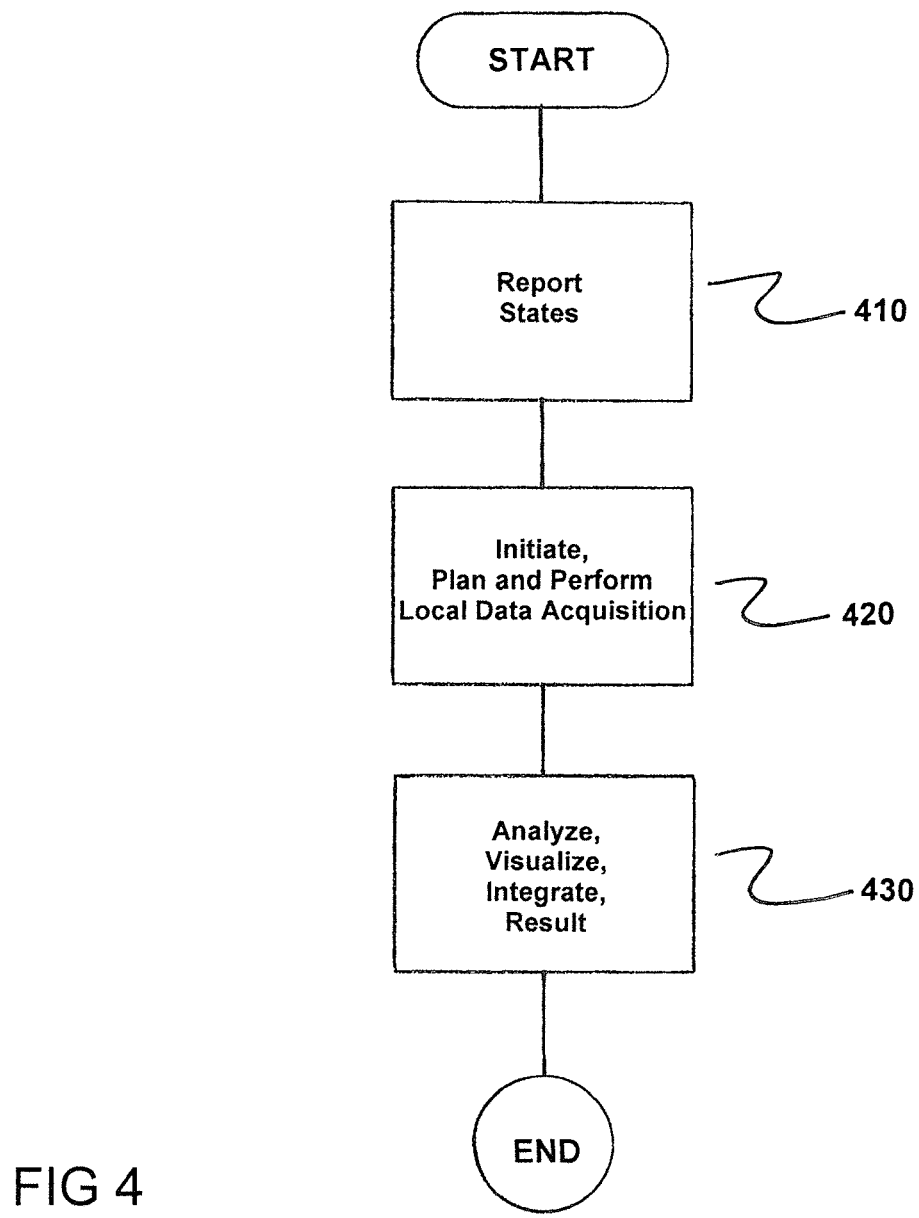
FIG. 4 is a flowchart of the method in accordance with the invention.

FIG. 4 is a flowchart of a method for visualizing and validating process events in process monitoring systems. The method comprises reporting, by a permanently installed sensor system, states to a process monitoring system, as indicated in step 410.

Next, local data acquisition is initiated, planned and performed (TR, AC) by the process monitoring system utilizing a mobile sensor if predefined limit values are exceeded, as indicated in step 420.

Next, a result of the data acquisition (PR) is analyzed and the result is visualized (VI) in the process monitoring system and the result is integrated (PDE) into the state information relating to the process events or an installation (PDE), as indicated in step 430.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for visualizing and validating process events in process monitoring systems, the method comprising:
    reporting, by a sensor system permanently installed at an installation, operational states of one of (i) process events and (ii) the installation to a process monitoring system;
    initiating, planning and performing, by the process monitoring system, local data acquisition utilizing a mobile sensor when predefined limit values are exceeded; and
    analyzing a result of said data acquisition visualizing said result in the process monitoring system and integrating said result into state information relating to one of (i) the process events and (ii) the installation.

2. The method as claimed in claim 1, wherein the mobile sensor is attached to an airborne platform.

3. The method as claimed in claim 2, wherein the airborne platform comprises one of (i) a drone, (ii) a helicopter and (iii) an airplane.

4. The method as claimed in claim 1, wherein the mobile sensors comprise one of (i) cameras, (ii) Near Infrared (NIR) cameras and (iii) Light Detection and Ranging (LiDAR) systems.

5. A system for controlling and monitoring technical processes and installations, comprising:
    means for acquiring, storing and evaluating process-relevant and installation-relevant data;
    means for process events;
    a controller;
    means for initiating alarms when limit values of predefined process parameters or installation parameters are exceeded or not reached; and
    a task server component which, after initiation of local data acquisition utilizes a mobile sensor, plans and controls a sequence of data acquisition and analyzes a result of the data acquisition.

\* \* \* \* \*